United States Patent [19]
Sampson et al.

[11] Patent Number: 5,705,050
[45] Date of Patent: Jan. 6, 1998

[54] ELECTROLYTIC PROCESS AND APPARATUS FOR THE CONTROLLED OXIDATION AND REDUCTION OF INORGANIC AND ORGANIC SPECIES IN AQUEOUS SOLUTIONS

[76] Inventors: Richard L. Sampson; Allison Hawkins Sampson, both of P.O. Box 780729, San Antonio, Tex. 78278

[21] Appl. No.: 639,756

[22] Filed: Apr. 29, 1996

[51] Int. Cl.⁶ .......................... B01D 61/48; C02F 1/461
[52] U.S. Cl. .................... 205/687; 205/688; 205/701; 205/703; 205/742; 205/746; 205/748; 205/753; 210/748; 521/27
[58] Field of Search ........................ 205/687, 688, 205/701, 703, 742, 746, 748, 753; 210/748; 521/27

[56] References Cited

U.S. PATENT DOCUMENTS

| | | |
|---|---|---|
| 2,428,329 | 9/1947 | Ham et al. ........................ 204/180 |
| 2,681,319 | 6/1954 | Bodamer ........................... 260/2.1 |
| 2,681,320 | 6/1954 | Bodamer ........................... 260/2.2 |
| 2,794,777 | 8/1957 | Pearson ............................ 204/151 |
| 3,074,863 | 1/1963 | Jasionowski ...................... 204/151 |
| 3,149,061 | 9/1964 | Parsi . |
| 3,764,499 | 10/1973 | Okubo et al. . |
| 3,766,034 | 10/1973 | Veltman . |
| 4,004,994 | 1/1977 | Andrus . |
| 4,013,554 | 3/1977 | Reis et al. . |
| 4,159,235 | 6/1979 | Kammel et al. . |
| 4,165,273 | 8/1979 | Azarov et al. . |
| 4,299,675 | 11/1981 | Korach . |
| 4,326,935 | 4/1982 | Moeglich . |
| 4,356,068 | 10/1982 | Darlington . |

(List continued on next page.)

FOREIGN PATENT DOCUMENTS

| | | |
|---|---|---|
| 0 473 087 | 8/1991 | European Pat. Off. . |
| 2 133 734 | 12/1972 | France . |
| 2 470 093 | 5/1981 | France . |
| 30 14 867 | 4/1980 | Germany . |
| 501 431 | 1/1971 | Switzerland . |
| 819 066 | 6/1981 | U.S.S.R. . |
| WO 90/15659 | 6/1990 | WIPO . |

OTHER PUBLICATIONS

Tison, Electrochemical Metals Recovery from Dilute Solutions Using Ion-Exchange Material, pp. 114–118 (no date given).
White, The Handbook of Chlorination, 2nd Ed., 1986, pp. 120–149 (no month).
Degremont, Water Treatment Handbook, 6th Ed., 1991, vol. 1, Ch. 3, Sec. 8 (no month).
Newman, Electrochemical Systems, 2nd Ed., pp. 502–506 (no date given).
Pletcher, Industrial Electrochemistry, 2nd Ed., 1990, pp. 160–167, 278–286 & 342–357 (no month).
Helfferich, Ion Exchange, 1962, pp. 58–59 (no month).

*Primary Examiner*—Arun S. Phasge
*Attorney, Agent, or Firm*—Jacobson, Price, Holman & Stern, PLLC

[57] ABSTRACT

Improvements on the electrolytic reactor and process of U.S. Pat. No. 5,419,816 and copending U.S. application Ser. No. 08/400,950, filed Mar. 9, 1995, now U.S. Pat. No. 5,609,742, are disclosed for the controlled oxidation and reduction of inorganic and organic species in dilute aqueous solutions. More specifically, other physical forms and additives for the modified ion exchange material can be used in the packed bed electrolytic reactor, including powdered ion exchange materials and solid membranes containing the modified ion exchange materials. Direct contact with only one electrode, the anode for oxidation, and the cathode for reduction, is required for the modified ion exchange resin, instead of with both electrodes. Superior performance is also demonstrated for bipolar operation of the electrolytic reactor in comparison to monopolar operation. Preferably, the polarity of the electrodes is reversed every 1 to 60 minutes. Finally, other point of use applications are disclosed for the electrolytic reactor and process, including sanitization and sterilization, such as useful in the medical, dental and veterinary industries, food and animal disinfection, bacteria control and waste treatment.

28 Claims, 9 Drawing Sheets

U.S. PATENT DOCUMENTS

| | | |
|---|---|---|
| 4,361,601 | 11/1982 | Hillman et al. . |
| 4,369,103 | 1/1983 | White . |
| 4,389,297 | 6/1983 | Korach . |
| 4,402,809 | 9/1983 | Dilmore et al. . |
| 4,472,252 | 9/1984 | DeLue . |
| 4,521,283 | 6/1985 | Pickens . |
| 4,596,641 | 6/1986 | Bridger et al. . |
| 4,636,286 | 1/1987 | DeLue et al. . |
| 4,683,039 | 7/1987 | Twardowski et al. . |
| 4,758,319 | 7/1988 | Klinkowski . |
| 4,786,384 | 11/1988 | Gerhardt et al. . |
| 4,806,215 | 2/1989 | Twardowski . |
| 5,026,465 | 6/1991 | Katz et al. . |
| 5,084,148 | 1/1992 | Kazcur et al. . |
| 5,106,465 | 4/1992 | Kazcur et al. . |
| 5,108,560 | 4/1992 | Cawlfield et al. . |
| 5,122,240 | 6/1992 | Cowley et al. . |
| 5,183,565 | 2/1993 | Zimmermann et al. . |
| 5,192,446 | 3/1993 | Salem et al. . |
| 5,198,080 | 3/1993 | Cowley et al. . |
| 5,419,816 | 5/1995 | Sampson et al. ................... 204/59 R |

15% Mn+4 on Inorganic Cation 578 mg/l Bromide in RO Water

FIG. 5

20% SPS 125 on Organic Anion 300 mg/l Bromine in RO Water

FIG. 6

15% Mn+4 on Inorganic Cation 602 mg/l Bromine in RO Water

FIG. 7

15% Mn+4 on Inorganic Cation 602 mg/l Bromine in RO Water

FIG. 8

15% Mn+4 on Inorganic Cation 595 mg/l Chlorite in RO Water

ELECTROLYTIC PROCESS AND APPARATUS FOR THE CONTROLLED OXIDATION AND REDUCTION OF INORGANIC AND ORGANIC SPECIES IN AQUEOUS SOLUTIONS

RELATED APPLICATIONS

The invention of this application represents improvements on the process and apparatus disclosed in Applicants' prior U.S. application Ser. No. 08/141,675, filed Oct. 27, 1993, entitled "Electrolytic Process and Apparatus for the Controlled Oxidation of Inorganic and Organic Species in Aqueous Solutions", now U.S. Pat. No. 5,419,816, issued May 30, 1995, and Applicants' copending U.S. application Ser. No. 08/400,950, filed Mar. 9, 1995, entitled "Electrolytic Process and Apparatus for the Controlled Oxidation or Reduction of Inorganic and Organic Species in Aqueous Solutions", now U.S. Pat. No. 5,609,742 the disclosures of which are both incorporated herein by reference for all purposes as if fully set forth.

FIELD OF INVENTION

The present invention relates to the improved oxidation or reduction of inorganic and organic species by directing the species through a packed bed ion exchange electrolytic reactor to produce the desired oxidized or reduced species.

BACKGROUND OF THE INVENTION

It is generally known that oxidizing and reducing inorganic and organic species in dilute aqueous solutions by electrolysis is nearly impossible to accomplish because of the poor mobility of these species in such aqueous solutions to reach the anodic or cathodic site where the oxidation or reduction takes place. The poor mobility causes a starvation of the reactive species to the respective anode or cathode, and this starvation is called polarization.

In an open cell electrolytic system with the latest dimensionally stable electrodes, high concentrations of the species to be oxidized or reduced must be flowed through the reactor to achieve even low conversion rates due to this problem of polarization. However, in a packed bed ion exchange electrolytic system as described in Sampson U.S. Pat. No. 5,419,816, and the referenced application for patent identified above, much higher conversion percentages are achieved at much lower concentrations of the inorganic or organic species to be oxidized or reduced. Sampson U.S. Pat. No. 5,419,816 describes a process for oxidizing a species in a dilute aqueous solution by passing the species through an electrolytic reactor packed with a monobed of modified cation exchange material. This modified cation exchange material has been treated such that a portion of its ion exchange sites are converted to so-called "semiconductor junctions" so that oxidation occurs both at the anode surface and at the semiconductor junction sites. Although the efficiency of the process is much greater than the efficiency of an open cell system, it has been discovered that improvement on the conversion rates demonstrated in the patent can be achieved.

Also, Sampson U.S. Pat. No. 5,419,816 describes the packed bed of the electrolytic process and apparatus as being all of one species, such as all modified cation exchange resin, whereas it has been found that variation in the bed is possible in certain circumstances. The prior referenced patent also describes that the packing material be in contact with both the anode and the cathode in the electrolytic reactor, whereas it has been found that, depending upon the nature of the packing material, it may need be in contact with only one electrode. The prior referenced patent further identifies only one physical form for the monobed ion exchange material, as particulate in nature, when it has been discovered that other physical forms can be utilized. Finally, the prior referenced patent describes the application of the packed bed electrolytic process and apparatus primarily for treatment of municipal water supplies and water plumbing systems, such as water distributors, cooling towers, etc. It has been discovered that this unique packed bed electrolytic process and apparatus has wide point of use applications in other fields, including sanitization and sterilization, such as medical, dental and veterinary disinfection and sterilization, surface and instrument disinfection and sterilization, hot and cold water sanitization, dental water line sanitization, membrane sanitization and sterilization, as well as food and animal disinfection, bacteria control, and waste treatment.

SUMMARY OF THE INVENTION

In describing the present invention, specific terminology will be resorted to for the sake of clarity. However, the invention is not intended to be limited to the specific terms so selected or to the specific embodiments disclosed. It is to be understood that each specific term includes all technical equivalents which operate in a similar manner to accomplish a similar purpose, and the specific embodiments are intended to illustrate, but not to limit, the broad technical application and utility of the present invention.

As used herein, the term "modified particulate ion exchange material" has the same meaning as taught by Sampson U.S. Pat. No. 5,419,816. As used herein, the term "modified ion exchange material" has the same meaning as "modified particulate ion exchange material" except the ion exchange material is not necessarily particulate in nature, which means it is not necessarily in granules, beads, or grains. Such non-particulate ion exchange material may include, but is not limited to, ion exchange powder and membranes. Such ion exchange materials are known to those skilled in the art and selection of a particular ion exchange material is considered within the skill of those knowledgeable in this field.

Also, as used herein, the term "bipolar" refers to an electrolytic cell and process where the DC electrical field can be reversed periodically in such a way that the anode becomes the cathode, and the cathode becomes the anode. This reverse process continues for some period of time, and then the DC electric field is reversed back to its original condition. The reversing then repeats for the prescribed intervals. In contrast, the term "monopolar" refers to a cell and process where the DC electrical field is not reversed so that the anode is always the anode, and the cathode is always the cathode.

The present invention is directed at an improved packed bed electrolytic process and apparatus which allows increased conversion of the species to be oxidized or reduced in aqueous solutions, especially dilute aqueous solutions. The invention utilizes a packed bed electrolytic reactor comprising an anode, a cathode, and a packed bed of particulate ion exchange material provided between the anode and cathode. The anode and cathode compartment may be separated by an ion exchange membrane or diaphragm for certain applications, but the anode compartment must contain packing material for improved oxidation to occur, and the cathode compartment must contain packing material for improved reduction to occur. The packed bed may, if desired, contain other species interspersed in the packed bed to perform functions other than oxidation or reduction. If an ion exchange membrane is used to separate the anode and cathode compartments, the membrane may also be made of modified ion exchange material.

In the preferred embodiment of the invention, the ion exchange material has a portion of its ion exchange sites converted to semiconductor junctions as taught in the Sampson U.S. Pat. No. 5,419,816. Also, the anode and cathode are constructed of materials that allow either to act as an anode or cathode, which is a practice well known to those skilled in the art of electrochemistry. An aqueous solution containing an inorganic or organic species is passed through the packed bed electrolytic reactor, and a direct current is applied in a bipolar fashion to the reactor to cause a portion of the said species to be oxidized or reduced. Preferably, the polarity of the DC current is reversed every 1 to 60 minutes. Surprisingly, it has been discovered that this bipolar operation yields higher conversion rates than monopolar operation over prolonged periods of time.

In another preferred form of this invention, the modified ion exchange material, such as ion exchange beads modified to have semiconductor junctions as taught in Sampson U.S. Pat. No. 5,419,816, is packed between one electrode and an ion exchange membrane such that the modified ion exchange material is in full contact with the electrode. Ion exchange material, modified or unmodified, may or may not be packed between the ion exchange membrane and the other electrode. For oxidation, the primary electrode would be the anode, the modified ion exchange material would be all or predominantly cationic in direct contact with the anode, the ion exchange membrane would be cationic, and the cathode chamber may or may not contain any ion exchange material. For reduction, the primary electrode would be the cathode, the modified ion exchange material would be all or predominantly anionic in direct contact with the cathode, the ion exchange membrane would be anionic, and the anode chamber may or may not contain any ion exchange material. It is possible, however, under certain circumstances, to include some quantities of the opposite ion exchange material, or other materials which do not transfer ions, in the otherwise monobed in order to achieve a particular result. Determining an appropriate additional material and its concentration to achieve a particular result is considered within the skill of those knowledgeable in this field.

In a final preferred form of the present invention, ion exchange material in the form of powder is modified as is taught in Sampson U.S. Pat. No. 5,419,816 to form semiconductor junctions on the ion exchange material. This modified ion exchange powder can then be either packed in the electrolytic reactor directly, or formed with other materials into an ion exchange membrane. The method of forming the ion exchange powder into an ion exchange membrane is known to those skilled in the art and is considered within the skill of those knowledgeable in this field. The modified ion exchange powder acts the same as the modified particulate ion exchange material taught by Sampson U.S. Pat. No. 5,419,816, when the powder is packed in the electrolytic reactor. The semiconductor junctions on the modified ion exchange membrane act the same as the semiconductor junctions on the modified particulate ion exchange material.

It is, therefore, a primary object of this invention to provide a process and apparatus for improving the efficiency of electrolytic oxidation or reduction of an inorganic or organic species, especially in dilute aqueous solutions.

It is a further object of the present invention, in accordance with the preceding object, to increase the rate of conversion of the species to be oxidized or reduced in a packed bed electrolytic process.

A still further object of the present invention is to provide a process which includes with the primary ion exchange material one or more additional ingredients in the packed bed to achieve a particular result or results beyond oxidation or reduction.

A still further object of the present invention is to demonstrate a process in which the species to be oxidized or reduced can be converted when the packing material is in contact with only one selected anode or cathode.

Another object of the present invention is to provide other physical forms for the ion exchange material which can be modified and used in the electrolytic reactor and process according to the foregoing objects.

A final object of the present invention to be delineated herein is to disclose other point-of-use applications for the electrolytic reactor and process of this invention.

These together with other objects and advantages which will become subsequently apparent reside in the details of the technology as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
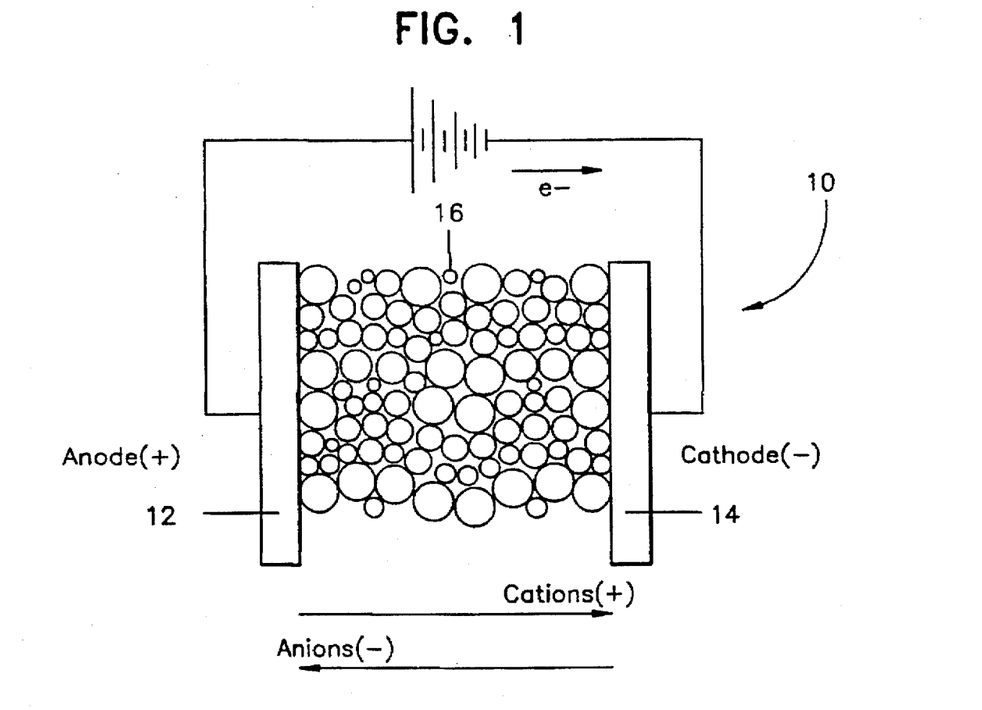
FIG. 1 shows a schematic cross-sectional view of a packed bed electrolytic reactor in accordance with the present invention.

Referring now to FIG. 1, there is shown a cross-sectional view of a basic packed bed electrolytic reactor 10 of the present invention. The electrolytic reactor 10 includes an anode 12, a cathode 14, and a packed bed of modified ion exchange material 16 located therebetween. The anode and cathode may be in the shape of rods, plates, or the like. The anode and cathode are connected to a source of direct current (DC) in a conventional manner. As shown, the anions move toward the anode, and the cations move toward the cathode of the ionic circuit through the packed ion exchange material. Meanwhile, electrons travel in the external circuit from the anode to the cathode in the conventional manner.

Figure 1A:
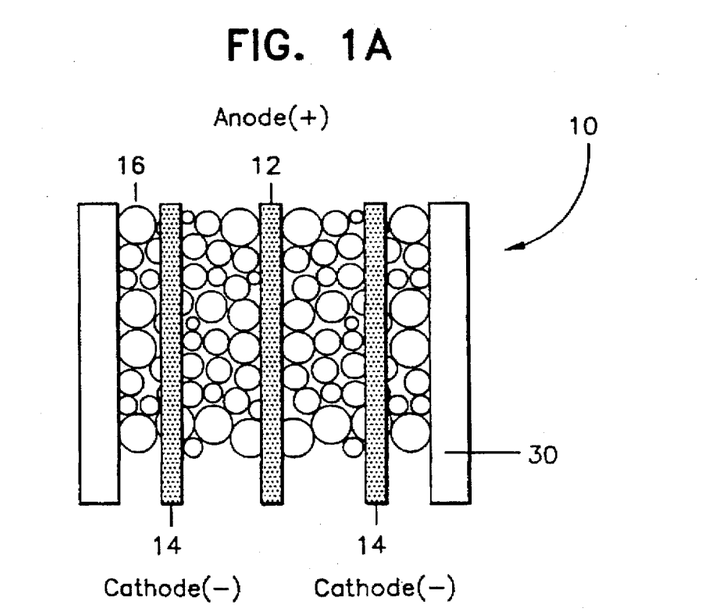
FIG. 1A shows a schematic cross-sectional view of another embodiment of an electrolytic reactor in accordance with the present invention.
Figure 1B:
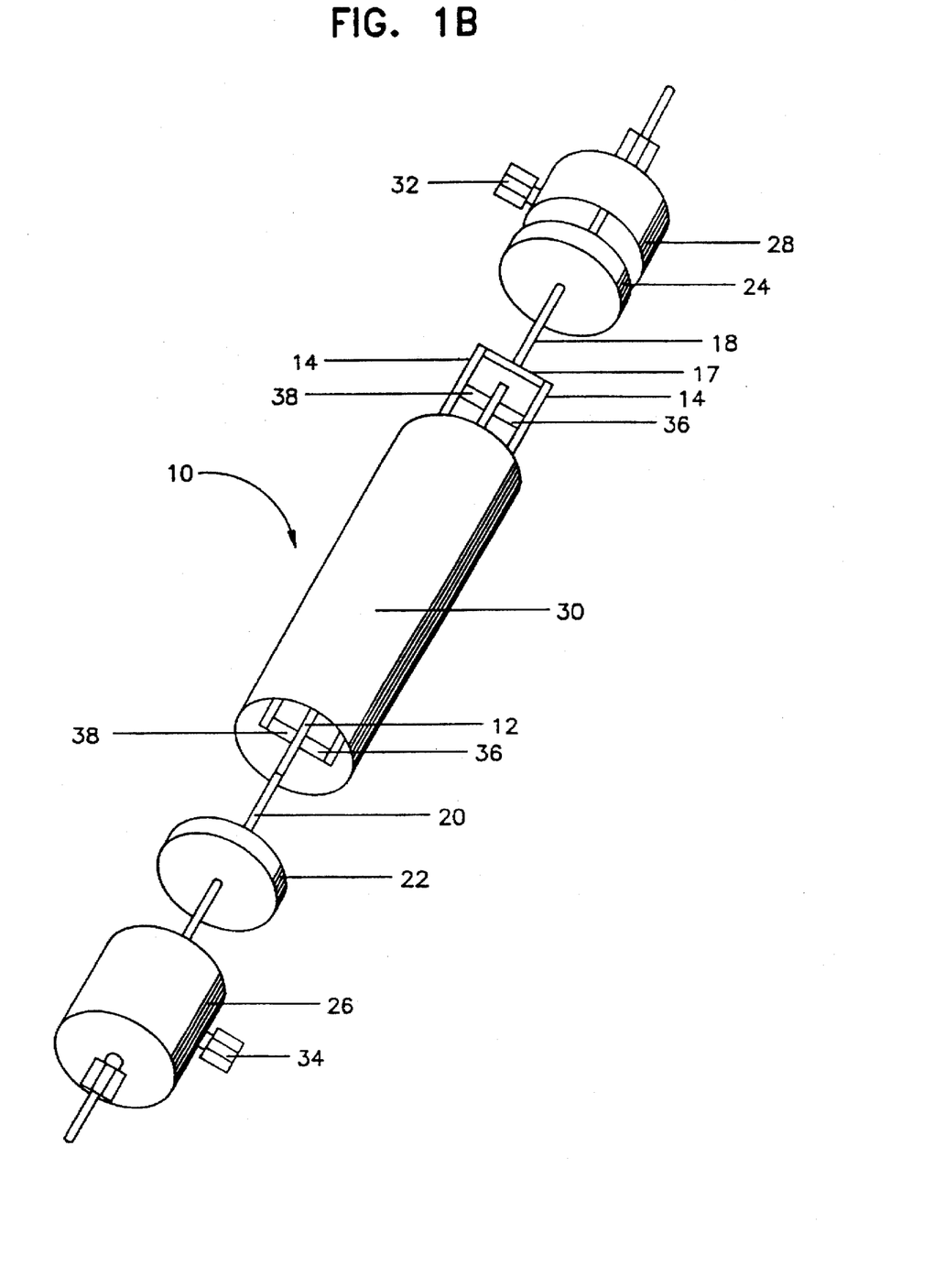
FIG. 1B shows an exploded perspective view of an electrolytic reactor constructed in accordance with FIG. 1A and used in connection with the tests producing the results illustrated in FIGS. 4 and 5.

In FIGS. 1A and 1B, where like numerals are used, there is shown one example of a packed bed electrolytic reactor in accordance with the present invention. A system of alternating electrodes is formed by using three pieces of iridium oxide on titanium mesh approximately 26 inches long and spaced about ½ inch apart. The center electrode 12 is about 1½ inches wide, and the two side electrodes 14 are approximately 1 inch wide. A titanium rod 20 is welded to the center electrode. The two side electrodes are joined by a welded titanium rod 17 which then has a second titanium rod 18 welded to it. The center electrode 12 is placed between the two side electrodes 14 so that the protruding titanium rods 18 and 20 are on opposite ends of the assembly. Plastic spacers 36 and 38 are then used to hold the pieces of the electrode assembly in place.

The electrode assembly is then placed in a piece of PVC pipe 30, approximately 1½ inches in diameter. One end cap 26, which has been drilled and tapped to accept the titanium rod 20 of the center electrode 12, a porous polypropylene distributor 22, and a fitting 34 for fluid flow, is placed on the end of pipe 30. Approximately 700 ml of modified particulate ion exchange material 16 is then poured into the pipe 30 through the open end so that the pipe 30 is completely filled, and the modified particulate ion exchange material is in direct contact with all of the electrodes 12 and 14. For oxidation, the modified particulate ion exchange material is cationic, and for reduction the modified particulate ion exchange material is anionic. The other end cap 28, which has been drilled and tapped to accept the titanium rod 18 of the side electrodes 14, a porous polypropylene distributor 24, and a fitting 32 for fluid flow, is placed on the other end of pipe 30. Fluid flows from bottom to top, entering through fitting 34 and exiting through fitting 32.

Figure 2:
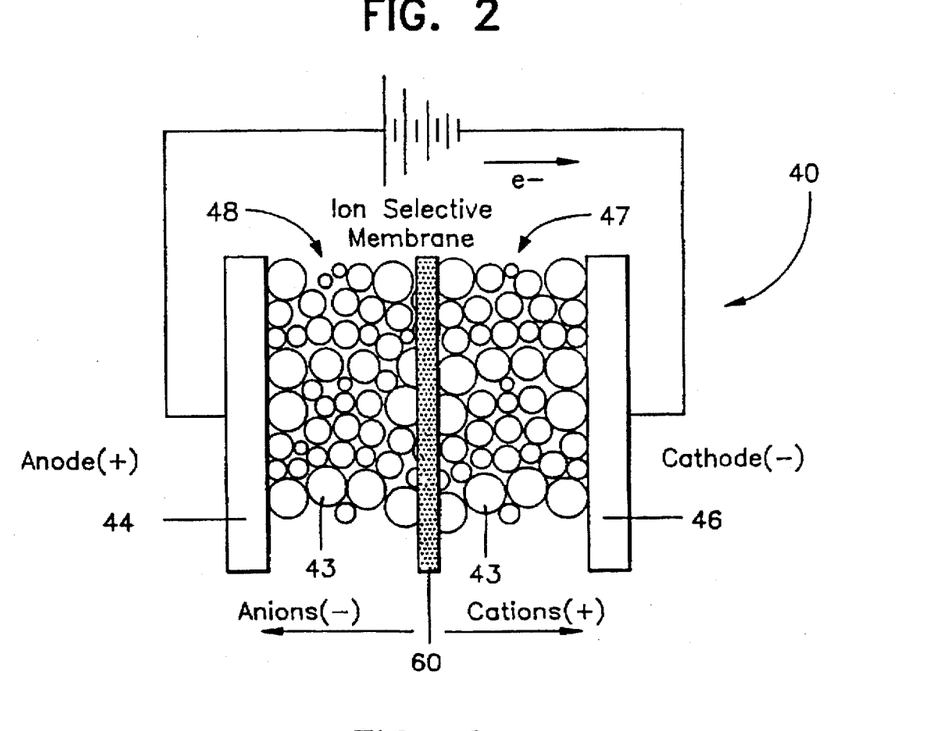
FIG. 2 shows a schematic cross-sectional view of another embodiment of an electrolytic reactor in accordance with the present invention.

In the embodiment shown in FIG. 2, the electrolytic reactor 40 includes anode 44 and cathode 46 which may be in the shape of rods, plates, or the like. The modified ion exchange material 43 is divided into two chambers, anodic chamber 48 and cathodic chamber 47, separated by an ion exchange membrane or diaphragm 60. For oxidation to occur, it has been discovered that it is necessary for the modified ion exchange material to be present in the anode chamber, but it is optional whether or not modified ion exchange material is present in the cathode chamber. Conversely, for reduction, it has been discovered that it is necessary for the modified ion exchange material to be present in the cathode chamber, but it is optional whether or not modified ion exchange material is present in the anode chamber.

Figure 2A:
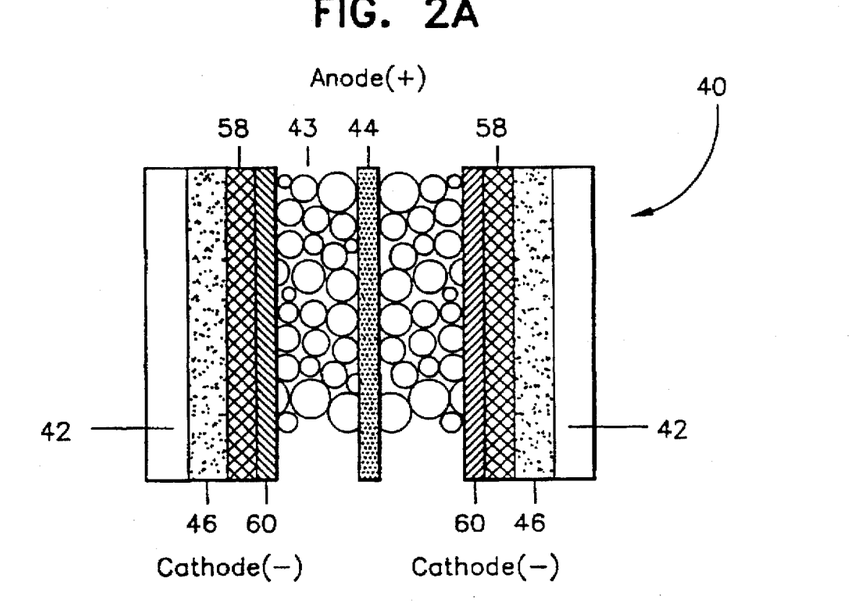
FIG. 2A shows a schematic cross-sectional view of yet another embodiment of an electrolytic reactor in accordance with the present invention.
Figure 2B:
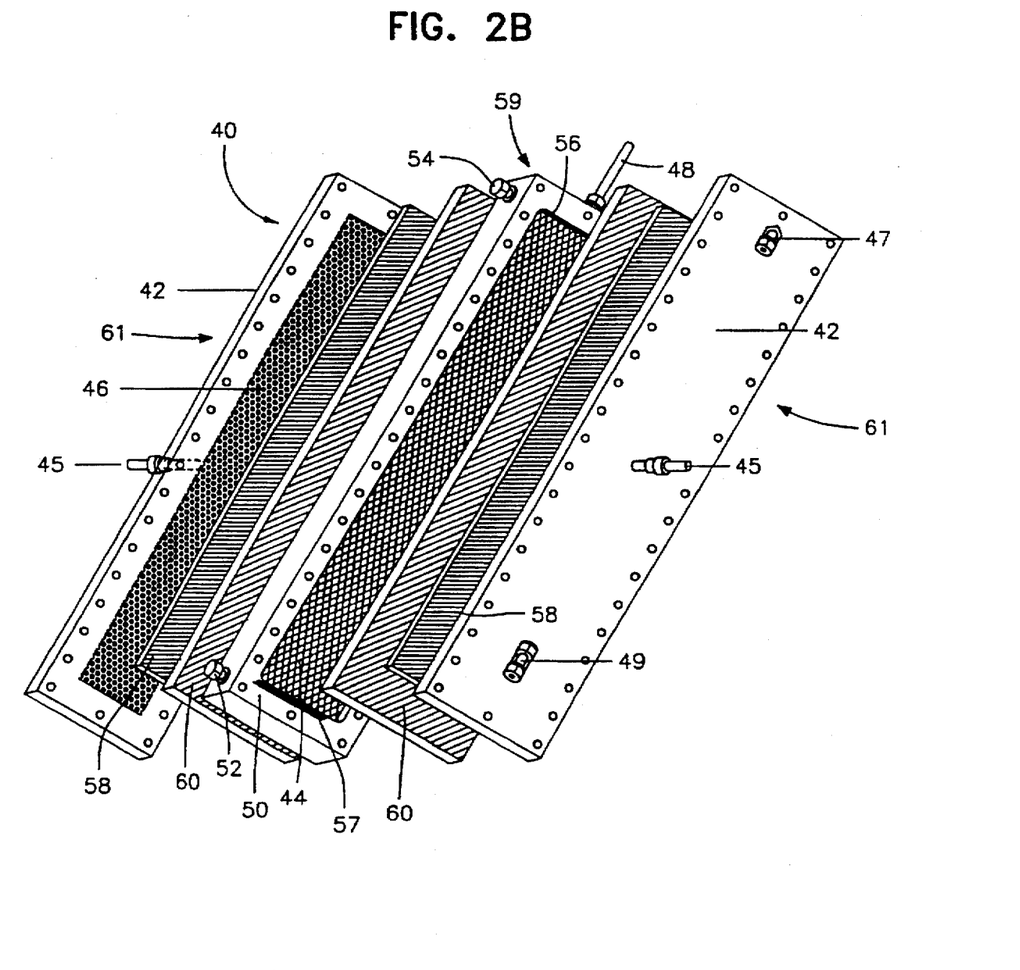
FIG. 2B shows an exploded perspective view of an electrolytic reactor constructed in accordance with FIG. 2A and used in connection with the tests producing the results illustrated in FIGS. 6 and 7.

An example of a packed bed electrolytic reactor having no ion exchange material in the cathode chamber is shown in FIGS. 2A and 2B, where like numerals are used. Cathodes 46 are pieces of stainless steel mesh, approximately 2 inches across by 26 inches long which has stainless steel rods 45 welded to the center backs of the pieces. Two pieces of flat PVC stock 42, about 5 inches across by about 28 inches long by about 1 inch thick, are machined such that depressions $\frac{1}{16}$ inch deep by 2 inches across by 26 inches long are cut in the center of each piece. The pieces 42 are then drilled and tapped to accept the protruding stainless steel rods 45 of the cathodes 46 and two fittings 47 and 49 through which fluid would flow. The cathodes 46 are inserted into the PVC pieces 42 to form two cathode assemblies 61, one on each side of the cell 40.

Anode 44 is a piece of iridium oxide on titanium mesh, approximately 2 inches across by 26 inches long, which has a titanium rod 48 welded to the end. A piece of flat PVC stock 50, about 5 inches across by about 28 inches long by 1 inch thick, is machined such that a hole about 2 inches across by 26 inches long is cut through the piece 50. The piece 50 is then drilled and tapped to accept the protruding titanium rod 48, two fittings 52 and 54 through which fluid would flow, and two porous polypropylene distributors 56 and 57. The anode 44 is then centered in the PVC piece 50 to form an anode assembly 59.

Two pieces of polypropylene screen 58 and two cation exchange membranes 60, all about 5 inches across by 28 inches long, are placed against the cathode assemblies 61 such that the screens 58 separate the cathodes 46 from the cation exchange membranes 60. The anode assembly is then placed against one of the cation exchange membranes 60 of one of the cathode assemblies. The anode chamber is filled with approximately 700 ml of modified particulate cation exchange material 43 such that the modified particulate cation exchange material is in direct contact with both sides of the anode 44 and between the two cation exchange membranes 60. The cation membranes 60 are placed on both sides against the anode assembly 59 such that the cation membranes 60 are in direct contact with the modified particulate cation exchange material 43 in the anode chamber. Gaskets (not shown) also separate the cathode assemblies from the anode assembly to prevent fluid from leaking. The entire electrolytic reactor is bolted together, or otherwise secured.

Figure 2C:
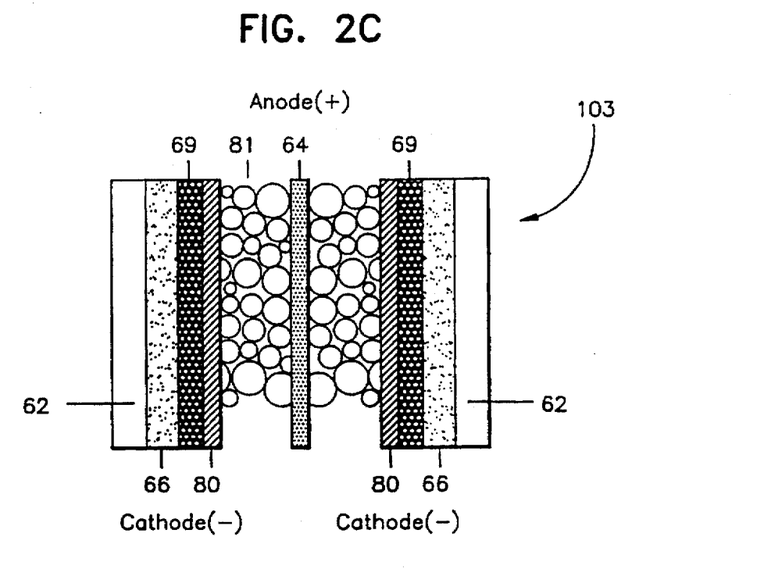
FIG. 2C shows a schematic cross-sectional view of still another embodiment of an electrolytic reactor in accordance with the present invention.
Figure 2D:
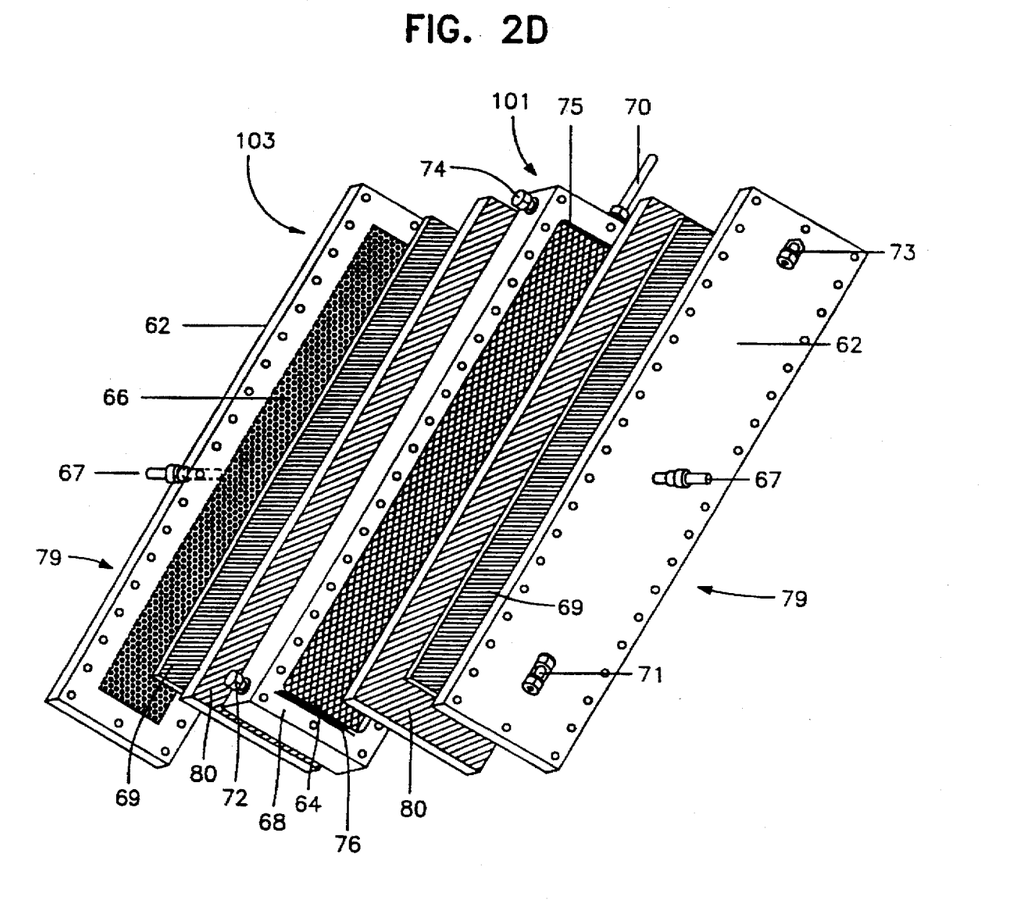
FIG. 2D shows an exploded perspective view of an electrolytic reactor constructed in accordance with FIG. 2C and used in connection with the tests producing the results illustrated in FIGS. 7 and 8.

Next, FIGS. 2C and 2D illustrate an example of a packed bed electrolytic reactor 103 having an ion exchange membrane and ion exchange material in the cathode chamber in accordance with the present invention. Cathodes 66 are pieces of stainless steel mesh, approximately 2 inches across by 26 inches long, which have stainless steel rods 67 welded to the center backs of the pieces. Two pieces of flat PVC stock 62, about 5 inches across by about 28 inches long by 1 inch thick, are machined such that depressions ¼ inch deep by 2 inches across by 26 inches long were cut in the center of each piece. The pieces 62 are then drilled and tapped to accept the protruding stainless steel rods 67 of the cathodes 66 and two fittings 71 and 73 through which fluid would flow. The cathodes 66 are inserted into the PVC pieces 62 and approximately 150 ml of anion exchange resin 69 is packed into each cathode chamber such that the anion exchange resin 69 is in direct contact with the cathodes 66 and the cation exchange membranes 80. This forms two cathode assemblies 79, one on each side.

Anode 64 is again a piece of iridium oxide on titanium mesh, approximately 2 inches across by 26 inches long, which has a titanium rod 70 welded to the end. A piece of flat PVC stock 68, about 5 inches across by about 28 inches long by 1 inch thick, is machined such that a hole about 2 inches across by 26 inches long is cut through the piece 68. The piece 68 is then drilled and tapped to accept the protruding titanium rod 70, two fittings 72 and 74 through which fluid would flow, and two porous polypropylene distributors 76 and 75. The anode 64 was then centered in the PVC piece 68 to form an anode assembly 101.

The anode assembly 101 is placed against one of the cation exchange membranes 80 of one of the cathode assemblies 79. The anode chamber is filled with approximately 700 ml of modified particulate cation exchange material 81 such that the modified particulate cation exchange material 81 is in direct contact with the anode 64 and between the two cation exchange membranes 80. The cation membranes 80 are placed on both sides against the anode assembly 101 such that the cation membranes 80 are in direct contact with the modified particulate cation exchange material 81 in the anode chamber. Gaskets (not shown) also separate the cathode assemblies 79 from the anode assembly 101 to prevent fluid from leaking. The entire electrolytic reactor is bolted together, or otherwise secured.

While the arrangements of anode, cathode, and packed bed illustrated in FIGS. 1, 1A, 1B, 2, 2A, 2C, and 2D are presently considered preferable, any arrangement in which modified ion exchange material is packed between the anode and cathode in a conventional electrolytic reactor or in at least one of the chambers of a divided electrolytic reactor can be used in accordance with this invention. Other embodiments of the invention include, but are not limited to separation of anolyte and catholyte compartments to control intermixing of gases and solutions and provision of any number of packed-bed chambers separated by ion exchange membranes or diaphragms placed between the anode and cathode to affect other oxidation, reduction, or displacement reactions.

While preferred materials have been described in connection with the drawings, the anode and cathode may be made of any suitable material, based on the intended use of the electrolytic reactor. For example, for halous acid production from a halide solution, the anode may be made of a conventional material, such as ruthenium and/or iridium on titanium, and the cathode may be of the same material or of stainless steel. Suitable anode and cathode materials are known to those skilled in the art and selection of a particular anode or cathode material is considered within the skill of those knowledgeable in this field.

Figure 3:
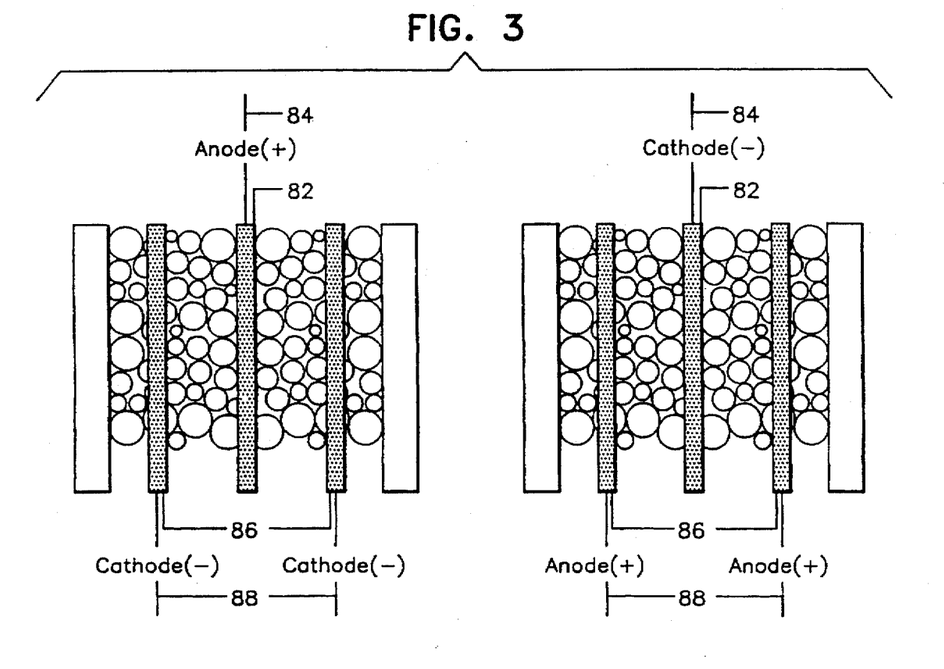
FIG. 3 is an illustration of how polarity can be reversed in an electrolytic reactor in accordance with the present invention.

The electrolytic reactors described in FIGS. 1, 1A, 1B, 2, 2A, 2B, 2C, and 2D can be operated in either a monopolar or a bipolar fashion. As illustrated in FIG. 3, a DC current is applied to the electrodes 82 and 86 of the electrolytic cell 90 such that the positive electrical lead 84 is connected to one electrode 82, and the negative electrical lead 88 is connected to the other electrode 86. The electrode 82 to which the positive electrical lead 84 is attached becomes the anode, and the electrode 86 to which the negative electrical lead 88 is attached becomes the cathode. The anions move toward the anode, and the cations move toward the cathode. If the electrolytic reactor operates in this fashion continuously, it is operating in a monopolar fashion.

Periodically, however, the DC current can be reversed such that the positive electrical lead 84 becomes negatively charged, and the negative electrical lead 88 becomes positively charged. This means that the anode 82 becomes negatively charged, so it is now the cathode. Conversely, the cathode 86 becomes positively charged, so it is now the anode. The anions must still move toward the anode, so they must reverse their direction. The cations must still move toward the cathode, so the must reverse their direction. If the electrolytic reactor operates in this fashion continually, where it is periodically reversing its polarity, it is operating in a bipolar fashion.

In addition to the industrial applications disclosed in Sampson U.S. Pat. No. 5,419,816, it has been discovered that many point-of-use applications exist for the technology disclosed. In the medical, dental and veterinary fields, microbiological contamination is a serious concern for both the patient and the health care provider. Currently, bottled disinfectants are used topically to prevent infection and prevent the spread of infection to others. These bottled solutions, such as bottled iodine, are stabilized to prevent decomposition. This stabilization, however, yields a large percentage of the iodine in solution unavailable for disinfection because it is either bound by the stabilizer, or the equilibrium of solution has been chemically shifted to favor the forms of iodine with no disinfection capabilities. The electrolytic oxidation process described herein yields a solution which is not stabilized, so it yields the highest concentration of disinfectant, such as free iodine, in its most effective form. The solution can be dispensed dropwise, in a spray, in a pulsed stream, in a steady stream, or in any way it is needed to disinfect. The surfaces to be disinfected range from skin to dental water lines, so a variety of disinfectants may be chosen for specific applications. For example, skin has been disinfected with iodine since the 1800s, but bromine would be a better disinfectant for most inanimate surfaces.

Sterilization is also a major concern in the medical, dental and veterinary fields. Surgical instruments, surfaces and other objects must be rendered free of all bacteria, spores, and other microorganisms for certain procedures. Currently, various liquid-phase and vapor-phase sterilizers are on the market, but most require dangerous or toxic chemicals to be stored nearby. The process described here electrolytically oxidizes an inorganic or organic species in an aqueous solution to form a liquid-phase sterilant as it is needed so there is no storage of a dangerous or toxic sterilant. The liquid-phase sterilant may be used directly, as in the case of aqueous bromine or chlorine dioxide, or the dissolved gas may be stripped from the liquid to be used as a vapor-phase sterilant, as in the case of gaseous chlorine dioxide.

Surface and instrument disinfection and sterilization applications are widespread outside of the medical, dental and veterinary fields as well. Food processing plants use a wide range of disinfectants and sterilants to sanitize their equipment, employees, and the food they are processing. Restaurants, grocery stores, delicatessens, and other places where food contamination can occur are also sanitized regularly. In the dairy industry, disinfectants are applied to the teats of the cows to prevent disease caused by frequent milkings, and in the poultry industry the water fed to the chickens is dosed with a sanitant to prevent the spread of water-borne disease in the chicken houses.

As further used herein, the terminology "sterilization" is intended to encompass not only sterilization but also disinfection, sanitization, microbial contamination control, and the like in the medical, dental and veterinary fields as described herein, as well as in the food, animal, water and other similar fields where sterilization, disinfection, sanitization and microbial contamination control is necessary or desirable.

A recent trend in the hospital and hotel industries has lowered the temperature of the hot water they dispense to prevent scalding. The hot water used to be hot enough to kill microorganisms in the water lines, but now it is not. A sanitizer must be introduced into the water, either as it is dispensed, as it is produced, or while it is in the distribution lines to prevent the growth of such harmful bacteria as legionella, which causes the often fatal Legionnaire's Disease. The electrolytic oxidation process described herein could be utilized to make a sanitizer, such as bromine or chlorine dioxide, to be injected into the water lines as it is dispensed, produced, or in the distribution lines.

The same danger of bacteria growth exists in cold water lines which do not contain a residual sanitant from a municipal water system or enough residual sanitant from a municipal water system. In many countries, household water comes from rain water which has been collected in a tank on the roof of the house. Since the rain water contains no sanitant, bacteria is likely to grow in the collection tank. To prevent this bacteria growth and the spread of disease, a disinfectant is injected into the tank on a periodic basis. This disinfectant can be produced by the electrolytic oxidation process described herein. For example, sodium chlorite can be electrolytically oxidized to form chlorine dioxide which is injected into the tank. If the fear of bacteria in the water still exists, a portable electrolytic oxidation device can be used to purify small quantities of water before it is drunk. Such a device would be useful to a traveller.

Many industries require membrane filtration in their processes. Many of these membranes cannot tolerate halogen-based sanitants such as chlorine, so they are susceptible to bacteria fouling on their surfaces. This bacteria fouling is known as a "biofilm" and can decrease the performance of the membranes. To remove the biofilm, non-halogen-based sanitants, such as peracetic acid and chlorine dioxide, are used. These sanitants, as well as others, can be produced by the electrolytic oxidation process described herein by electrolytically oxidizing acetic acid to peracetic acid or sodium chlorite to chlorine dioxide. Membranes are used in kidney dialysis, water filtration, pharmaceutical processing, desalination, semiconductor processing, and water recycling.

Many disinfectants and sterilants can also be made by using the electrolytic process described herein by reducing an inorganic or organic species in an aqueous solution. For example, it is possible to manufacture chlorine dioxide by reducing sodium chlorate as taught in U.S. Pat. Nos. 5,478,446 to Sundsvall and 5,296,108 to Kaczur. It is also possible to reduce bromate to form bromine or iodate to form iodine, both of which are disinfectants.

The waste treatment industry has the need for many reduction processes. Bromate in some circumstances is considered undesirable, so it can be reduced electrolytically by the process described herein to bromine and then further reduced to bromide. The bromide can then be removed from the aqueous stream by conventional ion exchange methods. The same step wise reduction can occur with heavy metal complexes such as the reduction of potassium permanganate to manganese dioxide to manganese metal or the reduction of $Cr^{+6}$ to $Cr^{+3}$ to $Cr^0$. These metals can then be removed from the aqueous stream by plating them out on a cathode.

Another potential application for the electrolytic reduction process described herein is the reduction of aldehyde or acetate compounds to their corresponding alcohol compounds. The alcohol can then be recovered and used as a fuel source.

DESCRIPTION OF SPECIFIC EXAMPLES

For Examples 1–4, the following testing procedures were used to test for bromide and bromine. To test for bromide, a Digital Titrator Model 16900-01 from the Hach Company was used. The method was the Mercuric Nitrate method for chloride. The result was then converted to bromide by multiplying by 2.25. The test was only used in solutions where no bromine was present, because the bromine can interfere with the result.

To test for bromine, the DPD Method 8031 of the Hach Company using a Direct Reading Spectrophotometer Model No. DR/2000 for the measurement of bromine (0–4.50 mg/l) was used except the instrument was blanked with deionized or reverse osmosis water between each sample. To bring the concentration of bromine within the range of the spectrophotometer, standard dilutions of the concentrated bromine solutions were made using deionized or reverse osmosis water as is the common practice.

EXAMPLE 1

Oxidation of Bromide Ions by using an Electrolytic Reactor without a Membrane

A sodium bromide feed solution was prepared by adding sodium bromide salt to reverse osmosis water such that the final concentration of bromide approximated 600 mg/l bromide. The final bromide concentration was tested to be 578 mg/l.

(A) A continuous stream of the 578 mg/l bromide feed solution was passed through the packed bed electrolytic reactor, having the structure illustrated in FIGS. 1A and 1B and described above in connection therewith, by passing the bromide solution through the reactor from the bottom to top such that the bromide solution had a flow rate of about 350 ml/min through the electrolytic reactor. The annular space around the electrodes in this example was packed with inorganic cation exchange material having approximately 15% of its transfer sites converted to semiconductor junctions with manganese as taught in Sampson U.S. Pat. No. 5,419,816. While passing the bromide solution through the packed bed electrolytic reactor, a controlled current of 3.5 Amps was applied to the anode and cathode in a monopolar fashion as described hereinabove and Sampson U.S. Pat. No. 5,419,816.

(B) The procedure of (A) above was repeated, with the exception that the controlled current of 3.5 Amps was applied to the anode and cathode in a bipolar fashion with 10-minute reversal cycles as described above for bipolar operation.

Figure 4:
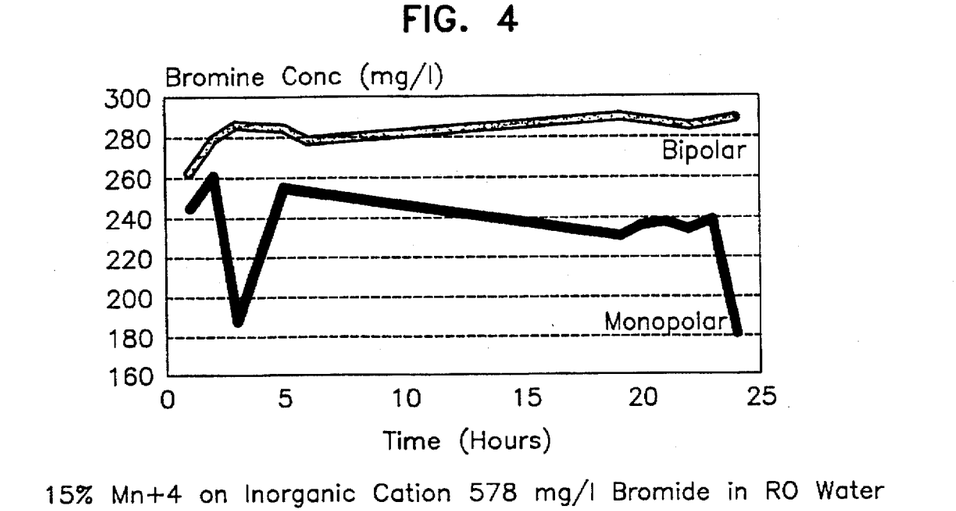
FIG. 4 is a graph showing bromine concentration versus time produced by oxidation of an aqueous bromide solution using a bipolar process in accordance with the present invention, and using the monopolar process disclosed in Sampson U.S. Pat. No. 5,419,816.

The results of the electrolytic processes in procedures (A) and (B) are shown in FIG. 4. FIG. 4 shows the total bromine concentration (mg/l) of the exiting solution versus time. As shown therein, bipolar operation produces consistently superior oxidation of the bromide to bromine and, after hours of operation, the conversion effectiveness of the monopolar operation decreases dramatically while the bipolar remains effective.

EXAMPLE 2

Reduction of Bromine Ions by using an Electrolytic Reactor without a Membrane A concentrated bromine solution was prepared by feeding an approximate 600 mg/l bromide solution into an electrolytic reactor, as illustrated in FIGS. 1A and 1B and described above in connection therewith, operated in a bipolar fashion. The average concentration of bromine produced by the bipolar electrolytic reactor was 286 mg/l.

(A) A continuous stream of the 286 mg/l bromine feed solution was passed through the same packed bed electrolytic reactor by passing the bromine solution through the reactor from the bottom to top such that the bromine solution had a flow rate of about 350 ml/min through the electrolytic reactor. The annular space around the electrodes in this example was packed with organic anion exchange material having approximately 20% of its transfer sites converted to semiconductor junctions with sulfonated polystyrene (SPS 125) as taught in Sampson U.S. Pat. No. 5,419,816. While passing the bromine solution through the packed bed electrolytic reactor, a controlled current of 3.0 Amps was applied to the anode and cathode in a monopolar fashion as described hereinabove and Sampson U.S. Pat. No. 5,419,816.

(B) The procedure of (A) above was repeated, with the exception that the controlled current of 3.0 Amps was applied to the anode and cathode in a bipolar fashion with 10-minute reversal cycles as described above for bipolar operation.

Figure 5:
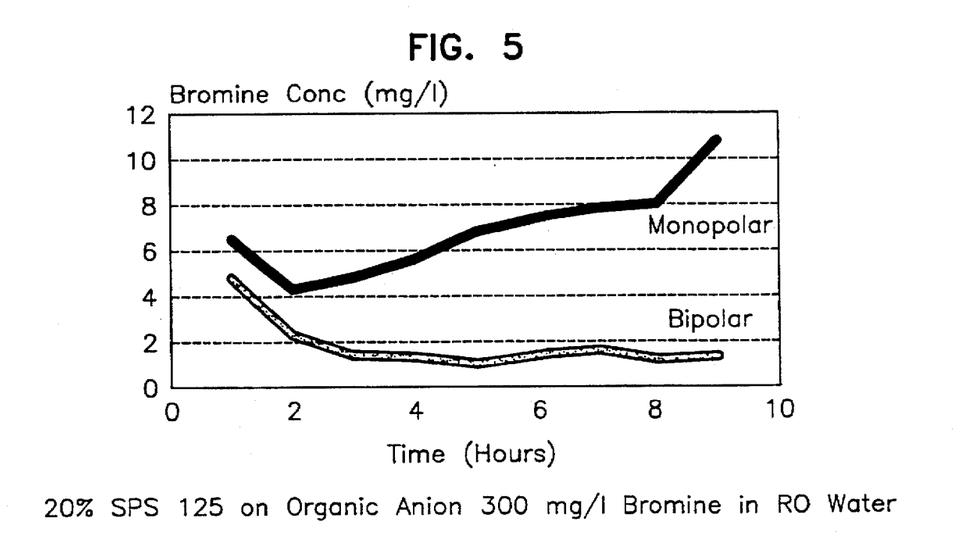
FIG. 5 is a graph showing residual bromine concentration versus time remaining from the reduction of an aqueous bromine/bromide solution using a bipolar process in accordance with the present invention, and using the monopolar process disclosed in Sampson U.S. Pat. No. 5,419,816.

The results of the electrolytic processes in procedures (A) and (B) are shown in FIG. 5. FIG. 5 shows the total residual bromine concentration (mg/l) of the exiting solution versus time. As shown therein, bipolar operation produces consistently superior reduction of the bromine to the bromide, especially after several hours of operation.

EXAMPLE 3

Oxidation of Bromide Ions by using an Electrolytic Reactor with Membranes

A sodium bromide feed solution was prepared by adding sodium bromide salt to reverse osmosis water such that the final concentration of bromide approximated 600 mg/l bromide. The final bromide concentration was tested to be 602 mg/l.

(A) A continuous stream of the 602 mg/l bromide feed solution was passed through the packed bed electrolytic reactor, having the structure illustrated in FIGS. 2A and 2B and described above in connection therewith, by passing the bromide solution through the reactor from the bottom to top such that the bromide solution had a flow rate of about 350 ml/min through the electrolytic reactor. The space around the anode in this example was packed with inorganic cation exchange material having about 15% of its transfer sites converted to semiconductor junctions with manganese as taught in Sampson U.S. Pat. No. 5,419,816. The cathode compartments were flushed bypassing reverse osmosis water through the reactor from bottom to top such that the water had a flow rate of about 50 ml/min through each compartment. While passing the bromide solution through the packed bed electrolytic reactor, a controlled current of 2.5 Amps was applied to the anode and cathode in a monopolar fashion as described hereinabove and Sampson U.S. Pat. No. 5,419,816.

(B) The procedure of (A) above was repeated, with the exception that the controlled current of 2.5 Amps was applied to the anode and cathode in a bipolar fashion as described above for bipolar operation. The reversal cycles were operated such that the current was reversed for one minute every 60 minutes.

Figure 6:
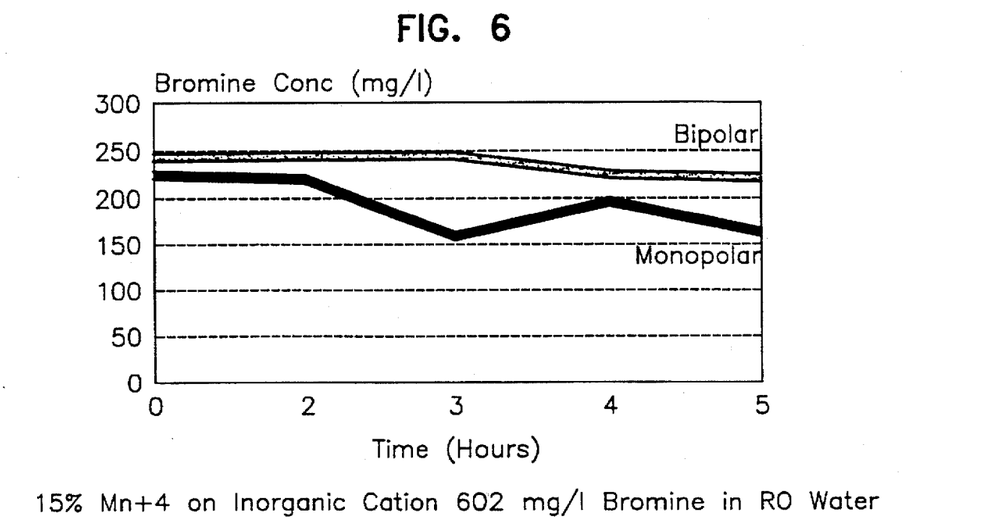
FIG. 6 is a graph showing bromine concentration versus time produced by oxidation of an aqueous bromide solution in accordance with another embodiment of the present invention, and by a known process.

The results of the electrolytic processes in procedures (A) and (B) are shown in FIG. 6. FIG. 6 shows the total bromine concentration (mg/l) of the exiting solution versus time. As shown therein, the electrolytic reactor, illustrated in FIGS. 2A and 2B, utilizing membranes and containing ion exchange material partially modified to semiconductor junctions, is effective for oxidizing bromide ions in a dilute aqueous bromide solution to bromine, similar to the results achieved using particulate modified ion exchange material as taught in Sampson U.S. Pat. No. 5,419,816, both in monopolar and bipolar operation. In addition, the bipolar operation of the electrolytic cell as disclosed by the instant invention provides superior results over the monopolar operation previously taught.

EXAMPLE 4

Effect of Anion Exchange Resin in the Cathode Chambers in an Oxidation Electrolytic Reactor with Membranes A sodium bromide feed solution was prepared by adding sodium bromide salt to reverse osmosis water such that the final concentration of bromide approximated 600 mg/l bromide. The final bromide concentration was tested to be 602 mg/l.

(A) A continuous stream of the 602 mg/l bromide feed solution was passed through the packed bed electrolytic reactor, having the structure illustrated in FIGS. 2A and 2B and described above in connection therewith, by passing the bromide solution through the reactor from the bottom to top such that the bromide solution had a flow rate of about 350 ml/min through the electrolytic reactor. The space around the anode in this example was packed with inorganic cation exchange material having about 15% of its transfer sites converted to semiconductor junctions with manganese as taught in Sampson U.S. Pat. No. 5,419,816. The cathode compartments were flushed by passing reverse osmosis water through the reactor from bottom to top such that the water had a flow rate of about 50 ml/min through each compartment. While passing the bromide solution through the packed bed electrolytic reactor, a controlled current of 2.5 Amps was applied to the anode and cathode in a bipolar fashion as described above for bipolar operation. The reversal cycles were operated such that the current was reversed for one minute every 60 minutes. The concentration of bromine produced averaged 232 mg/l over the 6-hour test cycle.

(B) The procedure of (A) above was repeated, with the exception that the bromide solution was passed through an electrolytic reactor, having the structure as illustrated in FIGS. 2C and 2D and described above in connection therewith. The concentration of bromine produced averaged 240 mg/l over the 6-hour test cycle.

Figure 7:
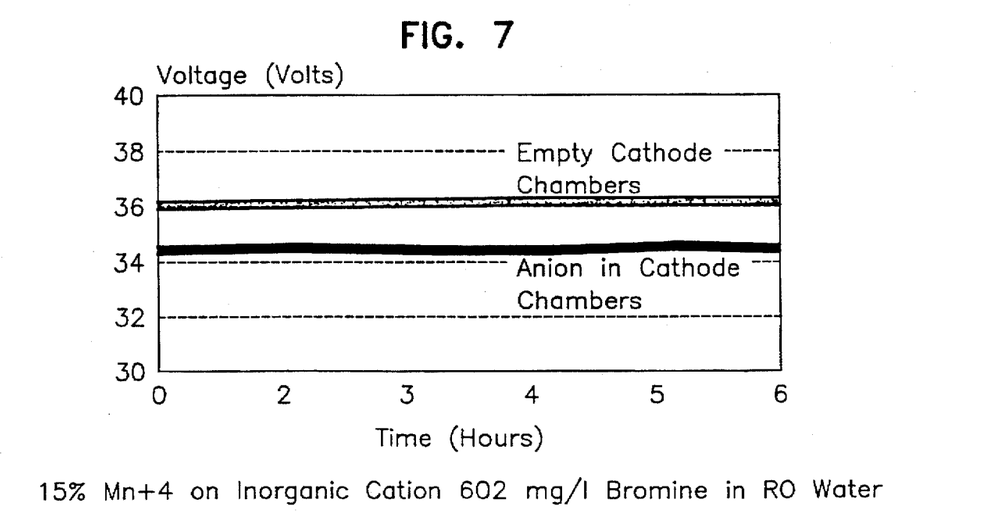
FIG. 7 is a graph showing voltage versus current produced by oxidation of an aqueous bromide solution in accordance with further embodiments of the present invention.

The results of the electrolytic processes in procedures (A) and (B) are shown in FIG. 7, which shows the voltage versus time. As shown in FIGS. 7, both processes are effective in oxidizing bromide to bromine, but lower voltage requirements are achieved if ion exchange materials are present in the cathode chambers.

EXAMPLE 5

Oxidation of Chlorite Ions

To test for chlorite, excess acidified bleach at a pH of 2 was added to a solution of sodium chlorite in water. The solution was then allowed to sit for 6 minutes. After 6 minutes, all of the chlorite in solution had been converted to chlorine dioxide. The chlorine dioxide was then tested by using the Method 8138 of the Hach Company using a Direct Reading Spectrophotometer Model No. DR/2000 for the measurement of chlorine dioxide (0–700 mg/l). To test for chlorine dioxide, the Method 8138 of the Hach Company using a Direct Reading Spectrophotometer Model No. DR/2000 for the measurement of chlorine dioxide (0–700 mg/l) was used.

A sodium chlorite feed solution was prepared by adding sodium chlorite salt to reverse osmosis water such that the final concentration of chlorite approximated 600 mg/l chlorite. The final chlorite concentration was tested to be 595 mg/l. A continuous stream of the 595 mg/l chlorite feed solution was passed through the packed bed electrolytic reactor, having the structure illustrated in FIGS. 2C and 2D and described above in connection therewith, by passing the chlorite solution through the reactor from the bottom to top such that the chlorite solution had a flow rate of 350 ml/min through the electrolytic reactor. The space around the anode in this example was packed with inorganic cation exchange material having about 15% of its transfer sites converted to semiconductor junctions with manganese as taught in Sampson U.S. Pat. No. 5,419,816. The cathode compartments were flushed by passing reverse osmosis water through the reactor from bottom to top such that the water had a flow rate of about 50 ml/min through each compartment. While passing the chlorite solution through the packed bed electrolytic reactor, a controlled current of 3.2 Amps was applied to the anode and cathode in a bipolar fashion as described above for bipolar operation. The reversal cycles were operated such that the current was reversed for one minute every 60 minutes.

Figure 8:
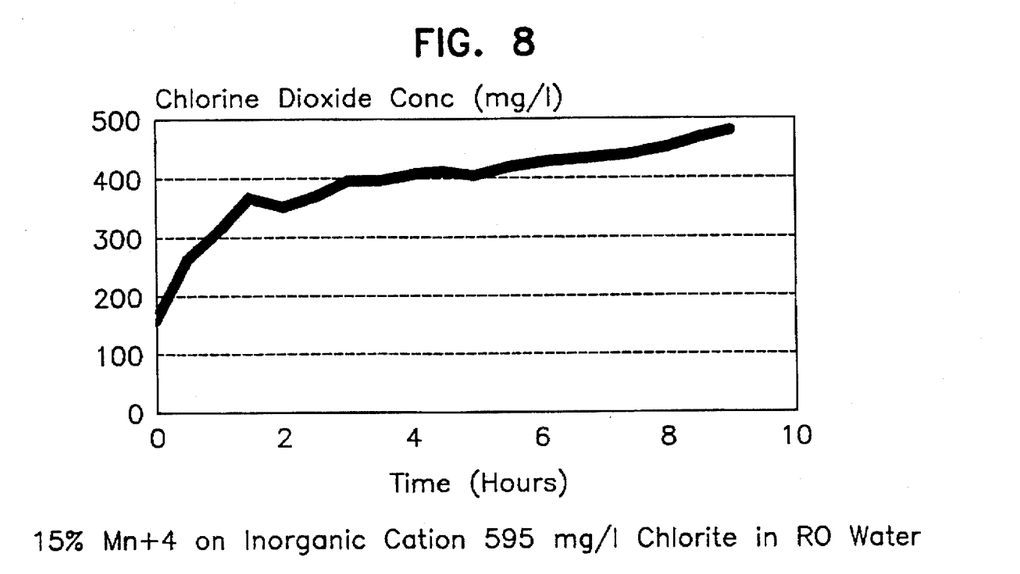
FIG. 8 is a graph showing chlorine dioxide concentration versus time produced by oxidation of an aqueous chlorite solution in accordance with an embodiment of the present invention.

The results of the electrolytic processing in accordance with Example 5 is shown in FIG. 8. FIG. 8 shows the total chlorine dioxide concentration (mg/l) of the exiting solution versus time. As shown therein, the electrolytic reactor and processing by bipolar operation in accordance with the present invention is highly effective in oxidizing chlorite ions and dilute aqueous solution to chlorine dioxide.

EXAMPLE 6

Manufacture of Ion Exchange Membrane using Modified Ion Exchange Material

An ion exchange powder treated to form semiconductor junctions as taught in Sampson U.S. Pat. No. 5,419,816 can be formed into a heterogeneous ion exchange membrane as taught in several patents such as Bodamer U.S. Pat. No. 2,681,320 and others. Heterogeneous membranes are commonly available for sale from companies such as Sybron Chemicals, Hydro Components Inc., and Asahi Glass. These membranes are used in many electrochemical processes such as electrodialysis, chlor alkali cells, and fuel cells. To form a cation exchange membrane in accordance with the present invention, a modified cation exchange material is used. To form an anion exchange membrane, a modified anion exchange material is used.

In the examples presented, the bipolar operation of the electrolytic reactor was carried out by reversing the direction of the DC current either during 10 minute cycles or for one minute every 60 minutes. Depending upon the configuration of the reactor in accordance with this invention, it is believed that the DC current direction should be reversed for at least about one minute at least every 120 minutes and, preferably, every 1 to 60 minutes.

In order to optimize and/or specialize the oxidation or reduction reactions, the aqueous solution containing the species to be oxidized or reduced preferably may be pretreated by various means. Some examples of pretreatment which may be used, but are not always necessary in accordance with this invention, include the following: filtration for clarity; carbon filtration for the removal of undesirable organics; specialized ion exchange of the common salts found in water to the desired salts to form specific oxidized or reduced species; addition of non-oxidizable or non-reducible species to control pH or another function; and addition of desired species to deionized or other high purity waters to form specific oxidized or reduced species. Other pretreatments may occur to those skilled in the art depending upon the species to be oxidized or reduced, the make-up of the aqueous solution, the nature of the ion exchange material and semiconductor junctions, and other variables.

Although specific examples are given for clarification of the process, any oxidizable or reducible inorganic or organic species can be oxidized or reduced by the present invention, and the examples are not intended to limit the present invention. Some examples of oxidizable species include halide salts, organic acids, total organic carbon, bacteria, and inorganic salts. Some examples of reducible species include halous acids, trihalomethane compounds, metallic oxides, phenolic compounds, and peroxygen compounds.

Further, the foregoing descriptions and drawings should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed is:

1. An electrolytic process for oxidizing a species in a dilute aqueous solution, comprising the steps of:

passing an aqueous feed solution containing said species to be oxidized through a packed bed of modified cation exchange material interposed between an anode and a cathode, with said bed of modified cation exchange material in direct contact with at least said anode;

applying a direct current across the anode and cathode in a bipolar fashion;

contacting said feed solution with said bed for a time to cause at least a portion of said species to be oxidized by said modified cation exchange material so that said aqueous solution contains said species in an oxidized form; and recovering the aqueous solution containing said oxidized species.

2. A process as defined in claim 1, wherein said modified cation exchange material is a particulate modified cation exchange material.

3. A process as defined in claim 1, wherein said modified cation exchange material is a powdered modified cation exchange material.

4. A process as defined in claim 1, wherein said modified cation exchange material has active semiconductor junctions formed by a cation species permanently bonded to said cation exchange material.

5. A process as defined in claim 1, wherein said modified cation exchange material includes an additive, but without substantially retarding the oxidation of said species.

6. An electrolytic process as defined in claim 1 wherein the said species to be oxidized is an inorganic or an organic species.

7. A process as defined in claim 1, wherein the step of passing said aqueous feed solution through said bed comprises passing said aqueous feed solution through at least one anode chamber, each said anode chamber containing a modified cation exchange material in contact with said anode and separated from each cathode chamber by a cation exchange membrane or diaphragm, and each said cathode chamber without any ion exchange material.

8. A process as defined in claim 7, wherein the cation exchange membrane includes modified cation exchange material.

9. A process as defined in claim 1, wherein the step of passing said aqueous feed solution through said bed comprises passing said aqueous feed solution through at least one anode chamber, each said anode chamber containing a modified cation exchange material in contact with said anode and separated from each cathode chamber by a cation exchange membrane or diaphragm, and each said cathode chamber containing ion exchange material.

10. A process as defined in claim 9, wherein said ion exchange material in said cathode chamber comprises modified ion exchange material.

11. A process as defined in claim 9, wherein the cation exchange membrane includes modified cation exchange material.

12. An electrolytic process for reducing a species in a dilute aqueous solution, comprising the steps of:

passing an aqueous feed solution containing said species to be reduced through a packed bed of modified anion exchange material interposed between an anode and a cathode, said bed of modified anion exchange material in direct contact with at least said cathode;

applying a direct current across the anode and cathode in a bipolar fashion;

contacting said feed solution with said bed for a time to cause at least a portion of said species to be reduced by said modified anion exchange material so that said aqueous solution contains said species in an reduced form; and recovering the aqueous solution containing said reduced species.

13. A process as defined in claim 12, wherein said modified anion exchange material is a particulate modified anion exchange material.

14. A process as defined in claim 12, wherein said modified anion exchange material is a powdered modified anion exchange material.

15. A process as defined in claim 12, wherein said modified anion exchange material has active semiconductor junctions formed by an anion species permanently bonded to said anion exchange material.

16. A process as defined in claim 12, wherein said modified anion exchange material includes an additive, but without substantially retarding the reduction of said species.

17. An electrolytic process as defined in claim 12 wherein the said species to be reduced is an organic species or an inorganic species.

18. A process as defined in claim 12, wherein the step of passing said aqueous feed solution through said bed comprises passing said aqueous feed solution through at least one cathode chamber, each said cathode chamber containing a modified anion exchange material in contact with said cathode and separated from each anode chamber by an anion exchange membrane or diaphragm, and each said anode chamber without any ion exchange material.

19. A process as defined in claim 18, wherein the anion exchange membrane includes modified anion exchange material.

20. A process as defined in claim 12, wherein the step of passing said aqueous feed solution through said bed comprises passing said aqueous feed solution through at least one cathode chamber, each said cathode chamber containing a modified anion exchange material in contact with said cathode and separated from each anode chamber by an anion exchange membrane or diaphragm, and each said anode chamber containing ion exchange material.

21. A process as defined in claim 20, wherein said ion exchange material in said anode chamber comprises modified ion exchange material.

22. A process as defined in claim 20, wherein the anion exchange membrane includes modified anion exchange material.

23. An ion exchange membrane having a portion of the total ion-exchange sites of said membrane converted to semiconductor junctions by permanently bonding counter ions to said ion exchange sites sufficient to cause formation of a free radical under the influence of direct electrical potential in an aqueous solution.

24. An ion exchange membrane as defined in claim 23, wherein said membrane is a cation exchange membrane and the free radical formed is the hydroxyl.

25. An ion exchange membrane as defined in claim 23, wherein said membrane is an anion exchange membrane and the free radical formed is the hydrogen.

26. An electrolytic process for oxidizing a species in a dilute aqueous solution, comprising the steps of:

passing an aqueous feed solution containing said species to be oxidized through a packed bed of modified cation exchange material interposed between an anode and a cathode, said bed of modified cation exchange material in direct contact with at least said anode;

applying a direct current across the anode and cathode;

contacting said feed solution with said bed for a time to cause at least a portion of said species to be oxidized by said modified cation exchange material so that said aqueous solution contains said species in an oxidized form; and recovering the aqueous solution containing said oxidized species.

27. A process as defined in claim 26, wherein said modified cation exchange material has active semiconductor junctions formed by a cation species permanently bonded to said cation exchange material.

28. A method for on-site sterilization or waste treatment of an object to be sterilized having undesirable contaminants thereon by use of a treated dilute aqueous solution which comprises adding an inorganic or organic species to at least a portion of a dilute aqueous solution, contacting said at least a portion of said dilute aqueous solution containing said inorganic or organic species with a monobed of particulate modified ion exchange material interposed between an anode and a cathode of an electrolytic reactor in which a direct current is applied across the anode and cathode, for a time to cause free radical formation in said modified ion exchange material and oxidation or reduction of at least a portion of said inorganic or organic species to a reducing or oxidizing reagent by said modified ion exchange material, applying said treated aqueous solution to said object to be sterilized to reduce or oxidize the undesirable contaminants thereon by said reducing or oxidizing reagent.

* * * * *

UNITED STATES PATENT AND TRADEMARK OFFICE
CERTIFICATE OF CORRECTION

PATENT NO. : 5,705,050
DATED : January 6, 1998
INVENTOR(S) : Richard L. SAMPSON et al.

It is certified that error appears in the above-indentified patent and that said Letters Patent is hereby corrected as shown below:

Claims 23, 24 and 25 are deleted.

Claim 28, line 7, the words "monobed of particulate" are deleted.

Signed and Sealed this

Fourteenth Day of July, 1998

Attest:

BRUCE LEHMAN

Attesting Officer

Commissioner of Patents and Trademarks